United States Patent [19]

Paul

[11] 4,352,712
[45] * Oct. 5, 1982

[54] APPARATUS FOR APPLYING GASKET-FORMING MATERIAL TO WORKPIECES

[76] Inventor: William A. Paul, 2338 Townley Rd., Toledo, Ohio 43614

[*] Notice: The portion of the term of this patent subsequent to Jun. 16, 1998, has been disclaimed.

[21] Appl. No.: 272,278

[22] Filed: Jun. 10, 1981

Related U.S. Application Data

[63] Continuation-in-part of Ser. No. 90,466, Nov. 1, 1979, Pat. No. 4,273,607.

[51] Int. Cl.³ ............................................. B44C 1/00
[52] U.S. Cl. ................................... 156/540; 118/213; 118/243; 118/263; 156/230; 156/384; 156/390; 156/566; 156/578; 156/580; 413/9; 413/19; 413/21; 413/57; 413/60; 425/110
[58] Field of Search .............. 156/540, 566, 230, 580, 156/390, 578, 384; 118/213, 263, 243; 264/259; 425/110; 100/215; 413/9, 57, 19, 60, 21

[56] References Cited

U.S. PATENT DOCUMENTS

| | | | |
|---|---|---|---|
| 624,835 | 5/1899 | Marchow et al. | 264/259 |
| 1,145,412 | 7/1915 | Furber | 118/263 |
| 2,264,628 | 12/1941 | Engert et al. | 156/291 |
| 3,232,815 | 2/1966 | Klopfenstein et al. | 156/566 |
| 4,102,304 | 7/1978 | Sebenham | 413/19 |
| 4,273,607 | 6/1981 | Paul | 156/578 |

Primary Examiner—John J. Gallagher
Attorney, Agent, or Firm—Allen D. Gutchess, Jr.

[57] ABSTRACT

Apparatus is provided for applying a bead of gasket-forming material to a mateable surface of a workpiece. The apparatus includes a source of gasket-forming material and a screen having a predetermined pattern conforming to the desired bead of the gasket-forming material. A spreader applies the gasket-forming material to one side of the screen and the gasket pattern is then formed on an adjacent transfer surface of a transfer pad on the opposite side of the screen. Means are provided for moving the pad with the pattern on the transfer surface and engaging it with the mateable surface of a workpiece mounted on a support spaced from the screen, thereby forming a bead of gasket-forming material on the mateable surface. The transfer surface is moved through an arc of 180° when moving between the screen and the workpiece surface.

14 Claims, 4 Drawing Figures

APPARATUS FOR APPLYING GASKET-FORMING MATERIAL TO WORKPIECES

This application is a continuation-in-part application of my co-pending application Ser. No. 090,466, filed Nov. 1, 1979, now U.S. Pat. No. 4,273,607. My co-pending application, Ser. No. 272,115, filed on June 10, 1981 is also a continuation-in-part application of that patent.

Gasket-forming material is known in the art for effecting seals between the mateable surfaces of the workpieces. The material constitutes a substitute for conventional gaskets heretofore known, and as such has a number of advantages. A large gasket inventory is eliminated and there is no need to cut special gaskets for particular applications. Further, conventional gaskets can shrink or wear out to produce loosening and leakage, thereby requiring retorquing, as well as producing disassembly and removal problems. The gasket-forming material, on the other hand, frequently provides an improved seal and effectively seals scratched or otherwise damaged surfaces, as well as improves the structural integrity of the assembled workpieces.

The gasket material is commonly supplied in tubes or cartridges and a bead of the material is manually spread from a spout of a tube onto the surface of the workpiece which is to be mated with a surface of another workpiece. Templates manipulated by hand have also been used to a limited extent where a number of workpieces are to have the beads of gasket-forming material applied. While the templates for applying the gasket-forming material are satisfactory for a few pieces, they have been inadequate for gasket-type seals on workpieces on a production basis. Further, because of the above-outlined advantages of the gasket-forming material, the desirability of applying the material quickly and accurately in production has accordingly increased.

The present invention provides apparatus for applying the gasket-forming material to mateable surfaces of workpieces in a rapid, accurate, and efficient manner. In accordance with the invention, an applicator supplies gasket material from a source to a transfer surface of a transfer pad. The gasket-forming material is positioned on the pad in a pattern of the same size and shape as the bead of the material which is to be applied to a mateable surface of a workpiece. Moving means moves the transfer pad from the position in which the transfer surface is engagable with the applicator to a position in which the transfer surface is engageable with a workpiece to which the bead is to be applied. The workpiece is mounted on a suitable support which carries the workpiece to a station at which the mateable surface is engaged by the transfer pad and then beyond that station, with other workpieces sequentially moved into position for the application of the gasket-forming beads. The transfer surface is rotated through an arc of 180° as it moves between the applicator and the workpiece.

It is, therefore, a principal object of the invention to provide apparatus for applying gasket-forming material to mateable surfaces of a plurality of workpieces.

Another object of the invention is to provide apparatus for applying gasket-forming material to workpiece surfaces more efficiently and rapidly than heretofore.

Many other objects and advantages of the invention will be apparent from the following detailed description of a preferred embodiment thereof, reference being made to the accompanying drawings, in which.

Figure 1:
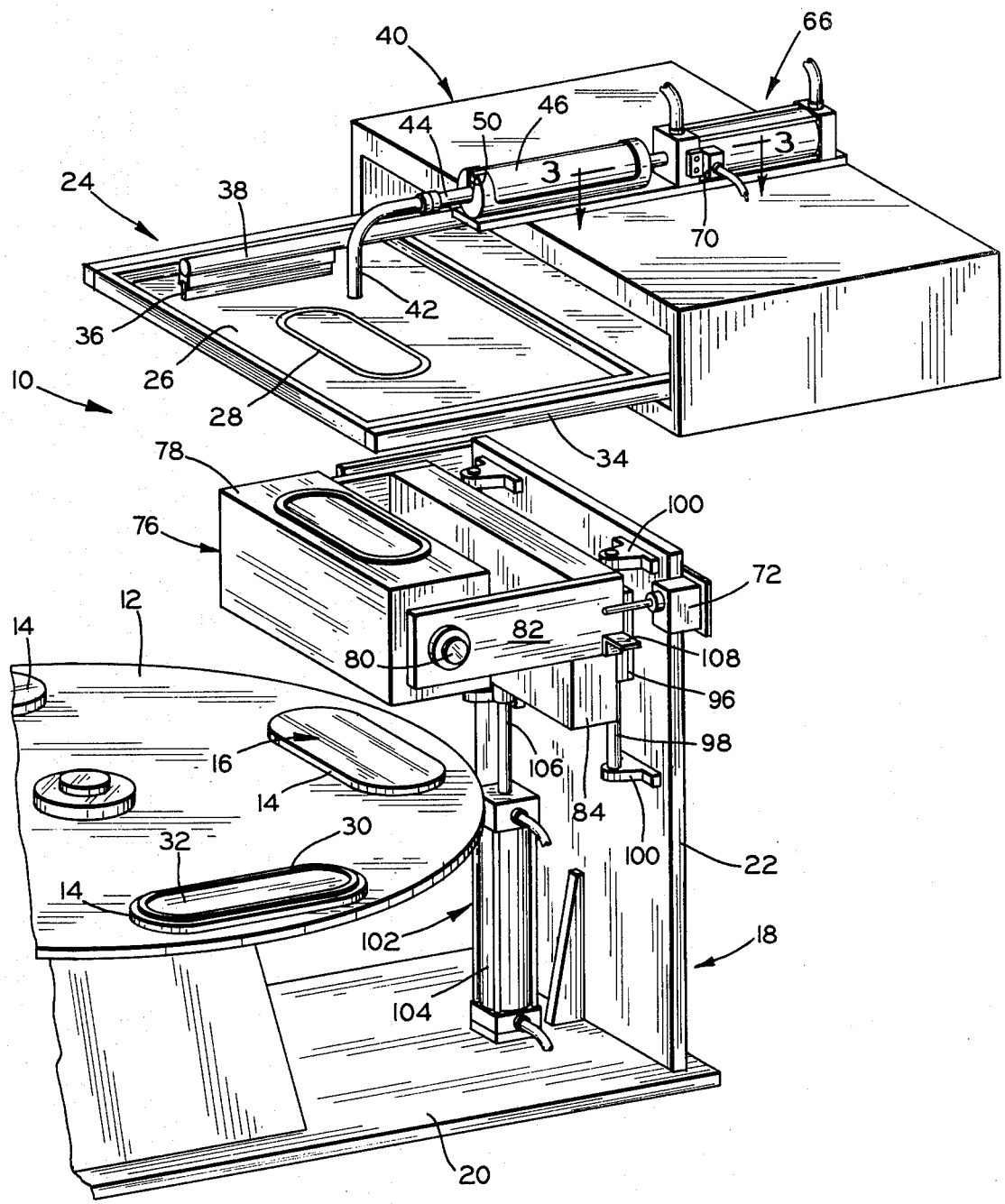
FIG. 1 is a somewhat schematic view in perspective of apparatus for applying beads of gasket-forming material in accordance with the invention.

Referring now particularly to FIG. 1, apparatus for applying beads of gasket-forming material to mateable surface of workpieces is indicated at 10. The apparatus includes a turntable 12 which supports workpieces 14 with the turntable incrementally rotated to move workpieces sequentially to and beyond a bead-applying station indicated at 16.

The apparatus 10 also includes a supporting frame 18 at one side of the turntable 12, the frame having a base plate 20 and an upright plate 22. A gasket-forming material applicator 24 is located above the supporting frame 18, being shown in a position higher than its operating position, for purposes of illustration. The applicator includes a screen 26 having a pattern 28 formed by minute openings in the screen, which pattern is of the size and shape of a bead 30 of the gasket-forming material applied to a mateable surface 32 of the workpiece 14. The screen 26 is supported in a suitable frame 34.

Gasket-forming material is spread over the screen 26 and through the perforate pattern 28 by a squeegee blade 36. The blade 36 is mounted on an arm 38 extending into a drive unit 40. The drive unit 40 is a commercially-available mechanism which moves the arm 38 and the blade 36 in a rectangular path. The blade 36 is moved across the screen 26 and across the pattern 28 in a horizontal direction. It is then raised and moved back to the initial side of the screen 26 in a horizontal motion where it is then lowered to place the blade 36 in contact with the screen 26 again to repeat the cycle.

Figure 3:
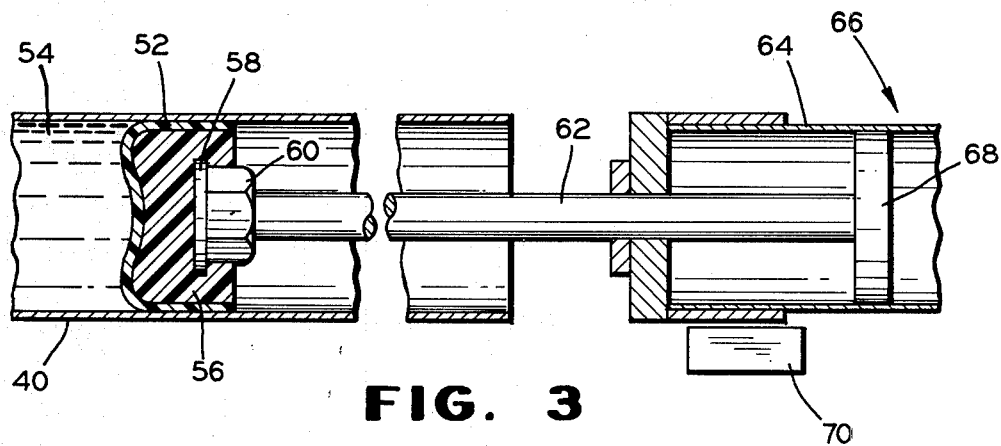
FIG. 3 is an enlarged, fragmentary view in cross section taken along the line 3—3 of FIG. 1.

The gasket-forming material is supplied to the screen 26 through a flexible tube 42. The tube 42 is connected to a spout 44 of a commercially-available cartridge 46 of the gasket-forming material which is held in a holder 48 having an opening 50 at one end to receive the spout 44. The end of the cartridge opposite the spout 44 has a cup 52 (FIG. 3) which seals off the end of the cartridge and which is moved toward the spout 44 to force gasket-forming material 54 in the cartridge through the spout.

The cartridge cup 52 is moved by a plunger 56, the plunger preferably being made of somewhat resilient plastic material and contoured to the internal shape of the cup 52. This is important because considerable pressure is required to dispense the gasket-forming material 54 and if the plunger 56 is not carefully shaped, the gasket-forming material can leak past the cup 52. The plunger 56 has a metal plate 58 cast therein to which is affixed a nut 60 extending beyond the back surface of the plunger. A piston rod 62 is threaded into the nut 60 and extends beyond the cartridge 40 and into a cylinder 64 of a fluid-operated ram 66. The piston rod 62 is affixed to a piston 68 within the cylinder 64 and the cup 52 is moved toward the cartridge spout 44 when fluid is supplied to the blind end of the cylinder 64.

Figure 4:
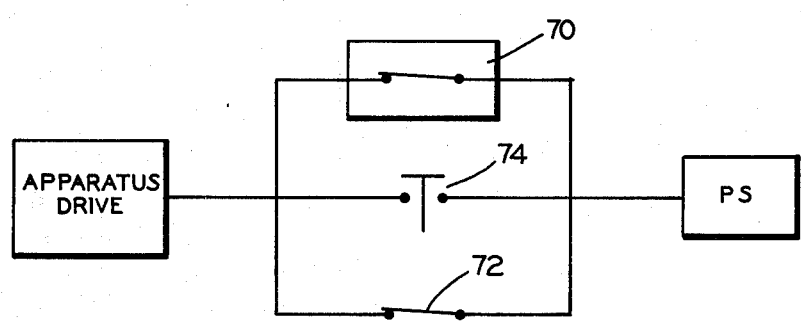
FIG. 4 is a diagrammatic view of a circuit for the gasket-forming material apparatus.

When the piston 68 is near the rod end of the cylinder 64 and the cartridge 40 is substantially empty, the piston 68 actuates a reed switch 70 which shuts off the apparatus 10. This assures that none of the workpieces 14 can receive an inadequate supply of the gasket-forming material. Actually, the reed switch 70, as shown in the wiring diagram of FIG. 4, is in parallel with a limit switch 72 (see also FIG. 1). The switch 72 remains closed and the apparatus drive continues to be connected to a power source PS until the apparatus reaches a predetermined position in a cycle, at which time the switch 72 also opens to stop the operation of the apparatus. A manually-operated, normally-open start switch 74 is also located in parallel with the switches 70 and 72 to start the apparatus drive again when a new cartridge is in place in the holder 48. The apparatus drive includes electrically-operated valves for the rams 92 and 104, and switches for the motors for the squeegee and turntable, for example.

A transfer member or block 76 has a transfer surface 78 which receives the gasket-forming material through the perforate pattern 28 of the screen 26. This gasket-forming material is then supplied to the surface 32 of the workpiece 14 when the transfer member 76 is rotated 180° and lowered. If desired, the transfer member 76 can have two of the transfer surfaces 78 so that the transfer member need not be rotated as often.

Figure 2:
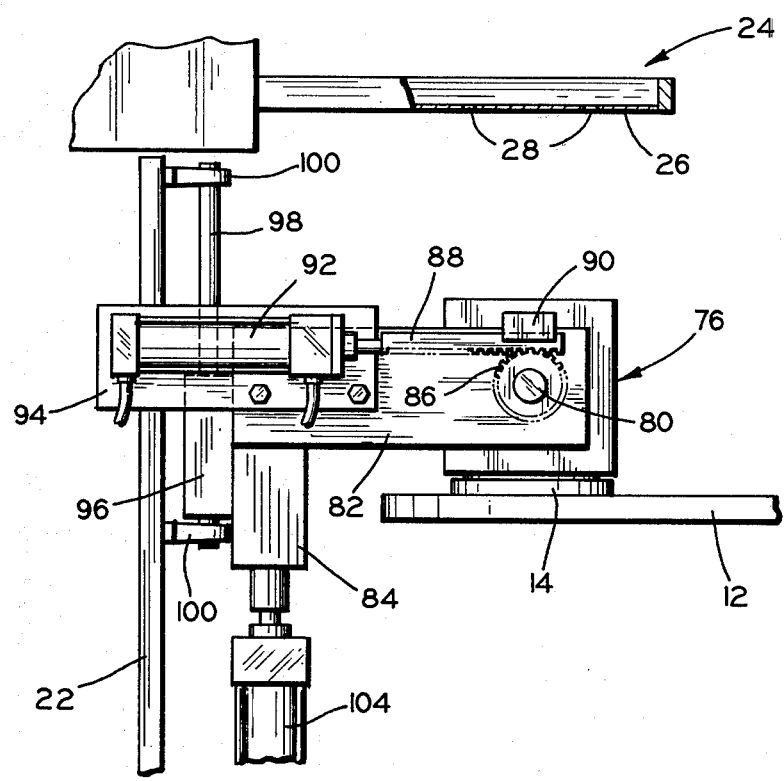
FIG. 2 is a schematic side view in elevation of a portion of the apparatus of FIG. 1.

The transfer member 76 has two oppositely-extending stub shafts 80 which are rotatably held by two arms 82 extending forwardly from a supporting block 84. As shown in FIG. 2, the stub shaft 80 has a pinion gear 86 affixed thereto on the side of the arm 82 opposite the member 76. The pinion gear is engaged by the gear rack 88 which is backed up by a slide block 90 extending from the arm 82. The gear rack 88 is lineally moved by a suitable fluid-operated ram 92 to rotate the pinion gear 86 and pivot the transfer member 76. The ram 92 is mounted on a suitable supporting plate 94 affixed to the arm 82.

The rear face of the supporting block 94 has two bearing blocks 96 extending therefrom and receiving guide rods 98 which are affixed to the upright plate 22 of the supporting frame 18 by brackets 100. The bearing blocks and rods guide the supporting block 84 and transfer member 76 in a lineal path between the applicator 24 and the turntable 12. The lineal movement of the supporting block 84 and the independent drive for the transfer member 76 aid in more precisely positioning the transfer member relative to the pattern 28 on the screen 26 and the workpieces 14 on the turntable 12. The lineal movement of the transfer member and supporting block is effected by a fluid-operated ram 102 having a cylinder 104 mounted on the base plate 20 and a piston rod 106 connected to the bottom of the supporting block 84.

The arm 82 which does not carry the rack and pinion has a flange 108 thereon which engages the limit switch 72 when the transfer member 76 is in its uppermost position and causes the limit switch to open. This does not affect the operation of the apparatus through the apparatus drive, however, as long as the reed switch 70 is closed. However, when the cartridge 40 is substantially empty, then the circuit is broken between the power source PS and the apparatus drive when the limit switch 72 is engaged, thus stopping the operation.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Apparatus for applying a bead of gasket-forming material in a pattern of predetermined size and shape to a mateable surface of a workpiece, said apparatus comprising means for supporting the workpiece, a source of gasket-forming material, a supporting member, a transfer member rotatably supported by said supporting member, applicator means for applying gasket-forming material to said transfer member from said source in the shape of the bead to be applied to the mateable surface, means for moving said supporting member in a lineal path toward and away from said applicator means and said workpiece supporting means, and means mounted on said supporting member for moving said transfer member in an arcuate path from a position with the transfer surface facing toward the mateable surface of the workpiece when on said supporting means and a position with the transfer surface facing said applicator means.

2. Apparatus according to claim 1 characterized by a supporting frame, and guide means mounting said supporting member on said supporting frame for movement in the lineal path.

3. Apparatus according to claim 2 characterized by said guide means comprising guide blocks mounted on said supporting member and guide rods mounted on said supporting frame.

4. Apparatus according to claim 1 characterized by said source of gasket-forming material comprising a cartridge of gasket-forming material having a spout at one end, a cartridge holder for said cartridge, a plunger at an end of said cartridge holder and having a plunger rod extending outwardly therefrom, a fluid-operated cylinder aligned with said plunger rod, said cylinder having a piston therein, said piston being connected to said plunger rod, means for supplying fluid under pressure to the blind end of said cylinder, and switch means associated with said cylinder for shutting off the gasket-forming apparatus when the cartridge is substantially empty.

5. Apparatus according to claim 4 characterized by said switch means being mounted on said cylinder and actuated when said piston is near the end of said cylinder toward aaid cartridge holder.

6. Apparatus according to claim 1 characterized by said source of gasket-forming material comprising a cartridge of gasket-forming material having a spout at one end and a cup at the other end, said cup having a concave surface facing said other end of said cartridge, a plunger having a contour of substantially the same size and shape as the concave surface of said cup, a plunger rod extending from said plunger, a fluid-operated cylinder receiving an end of said plunger rod, said cylinder having a piston therein, said piston being connected to said plunger rod, and means for supplying fluid under pressure to the blind end of said cylinder.

7. Apparatus according to claim 6 characterized by said plunger having threaded means extending therefrom to threadedly receive the end of said plunger rod opposite the end in said cylinder.

8. Apparatus for applying a bead of gasket-forming material in a pattern of predetermined shape to a mateable surface of a workpiece, said apparatus comprising a source of gasket-forming material, a transfer member having a transfer surface conforming to the mateable surface of the workpiece to which the bead of gasket-forming material is to be applied, applicator means for supplying gasket-forming material to said surface of said transfer member from said source in the shape of the bead to be applied to the mateable surface, said applicator means comprising a screen having a perforate portion of the same size and shape as the bead and a spreader for spreading gasket-forming material from said source over said screen and through the perforate portion, means for moving said transfer member from a position with the transfer surface adjacent the mateable surface of the workpiece and a position with the transfer surface adjacent said screen, said source of gasket-forming material comprising a cartridge holder for holding a cartridge of gasket-forming material, a plunger associated with said cartridge holder and having a plunger rod extending outwardly therefrom, a fluid-operated cylinder aligned with said plunger rod, said cylinder having a piston therein, said piston being connected to said plunger rod, means for supplying fluid under pressure to the blind end of said cylinder, and switch means associated with said cylinder for shutting off the gasket-forming apparatus when the cartridge is substantially empty.

9. Apparatus according to claim 8 characterized by said switch means being mounted on said cylinder and actuated when said piston is near the end of said cylinder toward said cartridge holder.

10. Apparatus according to claim 8 characterized by said plunger being of a resilient plastic material and having a metal connector imbedded therein for attachment to said plunger rod.

11. Apparatus according to claim 8 characterized by said plunger being of a somewhat resilient material and having a contour of a size and shape substantially equal to that of a concave surface of a cup located in an end of a cartridge of gasket-forming material.

12. Apparatus according to claim 8 characterized by additional switch means actuated by means connected to said transfer member when said transfer member is in the position adjacent said screen, said additional switch means being effective to shut off said apparatus when said switch means is operated and said additional switch means is engaged by said means connected to said transfer member.

13. Apparatus according to claim 8 characterized by supporting means for rotatably supporting said transfer member, guide means for mounting said supporting means for movement in a lineal path between the workpiece and said applicator means, and means for moving said supporting means in the lineal path toward and away from the workpiece and said applicator means.

14. Apparatus according to claim 13 characterized by independent moving means mounted on said supporting means for rotating said transfer member through an arc of at least 180°.

* * * * *